US012581957B2

(12) United States Patent (10) Patent No.: US 12,581,957 B2
Sain et al. (45) Date of Patent: Mar. 17, 2026

(54) ANTI-COUNTERFEITING FINGERPRINT

(71) Applicant: RAYTHEON COMPANY, Waltham, MA (US)

(72) Inventors: Patrick M. Sain, Torrance, CA (US); William Paul Posey, Inlet Beach, FL (US)

(73) Assignee: RAYTHEON COMPANY, Waltham, MA (US)

( * ) Notice: Subject to any disclaimer, the term of this patent is extended or adjusted under 35 U.S.C. 154(b) by 1188 days.

(21) Appl. No.: 17/234,402

(22) Filed: Apr. 19, 2021

(65) Prior Publication Data

US 2022/0336379 A1 Oct. 20, 2022

(51) Int. Cl.
*H04L 9/32* (2006.01)
*H01L 23/00* (2006.01)
*H01L 23/48* (2006.01)
*H01L 23/522* (2006.01)

(52) U.S. Cl.
CPC .......... *H01L 23/573* (2013.01); *H01L 23/481* (2013.01); *H01L 23/5223* (2013.01); *H01L 23/5226* (2013.01); *H04L 9/3278* (2013.01)

(58) Field of Classification Search
CPC . H01L 23/573; H01L 23/481; H01L 23/5223; H01L 23/5226; H04L 9/3278; H04L 63/0876; G06F 21/73
See application file for complete search history.

(56) References Cited

U.S. PATENT DOCUMENTS 9,365,749 B2 6/2016 Khanna
9,787,480 B2 * 10/2017 Guo ........................ G06F 7/588

| | | | | |
|---|---|---|---|---|
| 9,939,400 | B1 * | 4/2018 | Gozzini | ............... G01N 27/221 |
| 10,056,905 | B1 * | 8/2018 | Bowers, II | ............ H04L 9/0866 |
| 10,103,733 | B1 * | 10/2018 | Gurrieri | ........... H03K 19/00315 |
| 10,445,632 | B2 | 10/2019 | Kelsey et al. | |
| 10,560,079 | B1 * | 2/2020 | Das | .................... G01R 27/2605 |
| 10,574,467 | B2 * | 2/2020 | Afghah | ................ H04L 9/3278 |
| 11,240,047 | B2 * | 2/2022 | Hurwitz | ............... H04L 9/0869 |
| 11,251,959 | B2 * | 2/2022 | Wentz | ................... H04L 9/3247 |
| 11,290,289 | B2 * | 3/2022 | Shen | ........................ H03K 5/13 |
| 11,700,246 | B2 * | 7/2023 | Tremlet | ............ G06Q 20/3227 |
| | | | | 705/50 |
| 11,797,718 | B2 * | 10/2023 | Best | ........................ G06F 21/75 |
| 12,153,663 | B2 * | 11/2024 | Cambou | ................ G06F 21/73 |

(Continued)

FOREIGN PATENT DOCUMENTS

| | | |
|---|---|---|
| CN | 103578349 B | 8/2012 |
| WO | 2019023290 A1 | 1/2019 |
| WO | WO-2019136385 A1 * | 7/2019 ............... G06G 7/12 |

OTHER PUBLICATIONS

Wan et al., "An invasive-attack-resistant PUF based on switched-capacitor circuit" IEEE Transactions on Circuits and Systems I: Regular Papers 62.8 (Aug. 2015) pp. 2024-2034.

(Continued)

*Primary Examiner* — David Garcia Cervetti

(74) *Attorney, Agent, or Firm* — CANTOR COLBURN LLP

(57) ABSTRACT

A physically unclonable function (PUF) device includes capacitor array couple to an electronic device. The capacitor array includes a plurality of parallel conductive elements coupled to a dielectric material having a spatially varying permittivity to define array of randomly valued capacitors.

6 Claims, 4 Drawing Sheets

(56) References Cited

U.S. PATENT DOCUMENTS

| | | | | |
|---|---|---|---|---|
| 2005/0179446 A1* | 8/2005 | Hara | .................. | G06V 40/1306 |
| | | | | 324/662 |
| 2005/0226478 A1* | 10/2005 | Fujiyoshi | .......... | G06V 40/1306 |
| | | | | 382/124 |
| 2016/0063301 A1* | 3/2016 | Wu | .................... | G06V 40/1306 |
| | | | | 382/124 |
| 2016/0065378 A1* | 3/2016 | Kim | ...................... | G06F 21/602 |
| | | | | 713/184 |
| 2016/0149712 A1* | 5/2016 | Guo | .................... | H04L 63/0876 |
| | | | | 713/168 |
| 2017/0344407 A1* | 11/2017 | Jeon | ........................ | G06F 21/74 |
| 2018/0013431 A1 | 1/2018 | Bury et al. | | |
| 2018/0129801 A1* | 5/2018 | Cambou | ............... | H04L 9/0866 |
| 2018/0131529 A1* | 5/2018 | Cambou | ............... | H04L 9/3278 |
| 2018/0173917 A1* | 6/2018 | Endress | ............... | G06K 7/1417 |
| 2018/0341763 A1* | 11/2018 | Park | ........................ | G06F 21/42 |
| 2018/0357411 A1* | 12/2018 | Krishnamurthy | ... | H04W 12/068 |
| 2019/0026724 A1* | 1/2019 | Wade | ................. | G06Q 20/3278 |
| 2019/0163897 A1* | 5/2019 | Cambou | ............... | H04L 9/3278 |
| 2019/0354672 A1* | 11/2019 | Cambou | ............... | H04L 9/3236 |
| 2020/0145008 A1* | 5/2020 | Strukov | ............. | G11C 16/0425 |
| 2021/0019586 A1* | 1/2021 | Dreifus | ................... | G06F 21/34 |
| 2021/0036874 A1* | 2/2021 | Thapliyal | ................. | G09C 1/00 |
| 2021/0073503 A1* | 3/2021 | Ohashi | ............... | G06V 40/1306 |
| 2021/0083886 A1* | 3/2021 | Lee | .................. | H03K 19/17768 |
| 2021/0091952 A1* | 3/2021 | Wentz | ................... | H04L 9/3278 |
| 2021/0135886 A1* | 5/2021 | Lee | ....................... | H04L 9/0866 |
| 2021/0148977 A1* | 5/2021 | Bhunia | .......... | G01R 31/318328 |
| 2021/0184870 A1* | 6/2021 | Hurwitz | ................... | G09C 1/00 |
| 2021/0194707 A1* | 6/2021 | Aronson | ............... | H04L 9/0861 |
| 2021/0243042 A1* | 8/2021 | Ahn | ...................... | H04L 9/3278 |
| 2021/0319101 A1* | 10/2021 | Bhunia | .................. | G06F 21/56 |
| 2021/0377058 A1* | 12/2021 | Froment | ............... | H01L 23/576 |
| 2022/0043937 A1* | 2/2022 | Spalding | ................. | G06F 18/22 |
| 2022/0045872 A1* | 2/2022 | Holland | .................. | G06F 17/18 |
| 2022/0067140 A1* | 3/2022 | Cambou | ................. | G06F 21/45 |
| 2022/0116233 A1* | 4/2022 | Hoffman | ............... | H04L 9/3278 |
| 2022/0131713 A1* | 4/2022 | Schifmann | ............ | H04L 9/3278 |
| 2022/0358253 A1* | 11/2022 | Best | ........................ | G06F 21/75 |
| 2023/0091028 A1* | 3/2023 | Norrod | ................. | H04L 9/3263 |
| | | | | 713/189 |
| 2023/0163980 A1* | 5/2023 | Cambou | ............... | H04L 9/3278 |
| | | | | 713/165 |
| 2025/0126467 A1* | 4/2025 | Garcia Morchon | .. | H04W 12/63 |

OTHER PUBLICATIONS

International Search Report and Written Opinion issued in International Application No. PCT/US2022/015024; Application Filing Date Feb. 3, 2022; Date of Mailing May 19, 2022 (17 pages).

Ramkumar et al., "Novel anisotropic conductive adhesive for 3D stacking and lead-free PCB packaging-A review" 2011 IEEE 61st Electronic Components and Technology Conference (ECTC). IEEE, (May 2011) pp. 246-254.

* cited by examiner

ANTI-COUNTERFEITING FINGERPRINT

GOVERNMENT LICENSE RIGHTS

This disclosure was made with Government support under FA8807-19-C-0002 awarded by the Department of Defense (DOD). The Government has certain rights in the disclosure.

BACKGROUND

The present disclosure relates to anti-tampering technologies, and more specifically, a device including an anti-counterfeiting fingerprint.

Supply chains transform components and raw materials into a finished product or device. Often times a component or device is provided to several different supply chain entities before the finished product's entry into service. As a result, the product or device may be susceptible to manipulation and can be provided with counterfeit components. These counterfeit components can have inferior specifications and quality. A counterfeit device may also be installed with unauthorized malware that gathers information unbeknown to the product owner. Accordingly, there is a need for improved techniques for tracking component provenance and identifying counterfeit components as they move across a supply chain before the counterfeit components have been integrated into the supply chain's finished product.

SUMMARY

According to a non-limiting embodiment, a physically unclonable function (PUF) device includes capacitor array couple to an electronic device. The capacitor array includes a plurality of parallel conductive elements coupled to a dielectric material having a spatially varying permittivity to define array of randomly valued capacitors.

According to another non-limiting embodiment, an anti-counterfeiting fingerprint readout validity system is provided. The anti-counterfeiting fingerprint readout validity system includes a capacitor array coupled to an electronic device. The capacitor array including a plurality of parallel conductive elements coupled to a dielectric material having a spatially varying permittivity to define array of randomly valued capacitors. At least one driver circuit is configured to supply a voltage to the capacitor array, which outputs a current. At least one receiver circuit is configured to read out current that is output by the capacitor array in response receiving the voltage. The voltage energizes selected capacitors included in the capacitor array and the current represents a capacitance corresponding to the selected capacitors.

According to yet another non-limiting embodiment, a method of validating an anti-counterfeiting fingerprint is provided. The method comprises delivering, via at least one driver circuit, voltage to a capacitor array to energize selected capacitors included in the capacitor array and reading out, via at least one receiver circuit, current that is output by the capacitor array in response receiving the voltage. The method further comprises determining a capacitance corresponding to the selected capacitors, determining a digital fingerprint based on the capacitance, and authenticating the electronic device based on the digital fingerprint.

According to still another non-limiting embodiment, a method of validating an anti-counterfeiting fingerprint is provided. The method comprises delivering, via at least one driver circuit, voltage to a capacitor array to energize selected capacitors included in the capacitor array and reading out, via at least one receiver circuit, current that is output by the capacitor array in response receiving the voltage. The method further comprises determining ratios of capacitances derived from the currents output by the capacitor array, such that the ratios correspond to the selected capacitors. The ratios are unaffected by component aging, temperature, and power supply variations. The method further comprises selecting the driver and receiver circuits used in the ratio calculations by use of a digital challenge input, determining a unique digital fingerprint based on the selected capacitance ratios, and authenticating the electronic device based on the digital fingerprint.

Additional features and advantages are realized through the techniques of the present disclosure. Other embodiments and aspects are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Various non-limiting embodiments described herein provides an anti-counterfeiting fingerprint readout validity system capable of protecting an device from unauthorized modifications and/or copying. The fingerprint system employs an array of capacitors. The values of the capacitances in the array vary from each other, in some non-limiting embodiments according to a random distribution, and provide the source of entropy in a PUF device according to a non-limiting embodiment. Alternating current (AC) voltages are applied to the array driver inputs and the resulting electrical current is read out on the array receiver outputs by receiver circuitry. The current readouts are digitized and used to compute ratios that are unaffected by component aging, temperature, and voltage variations induced by the capacitor array interface circuitry. The ratios are converted into a unique digital signature or digital "fingerprint" unique to the capacitor array which makes the PUF device desirable for use in cryptographic applications.

In one or more non-limiting embodiments, the PUF device provides entropy associated with the current readouts that can be converted into a digital bits. The bits can be used as a digital fingerprint, which makes the PUF device desirable for use in cryptographic applications. In addition, post-processing using carefully selected combinations of the measured signals enables forming fingerprints immune to thermal variations, aging, and voltage variations or, if desired, selectively responsive to thermal or electrical changes.

According to at least one non-limiting embodiment, an anti-counterfeiting fingerprint readout validity system is provided to interrogate a PUF device that includes a capacitor array coupled to an electronic device. The system produces a unique fingerprint in response to a digital challenge. Attempts to clone the fingerprint are impractical, and removing the PUF device from the electronic device will destroy the fingerprint. Verification of the fingerprint provides assurance that the electronic device has not been counterfeited. The fingerprint is unaffected by component aging, temperature, and power supply variations.

Figure 1:
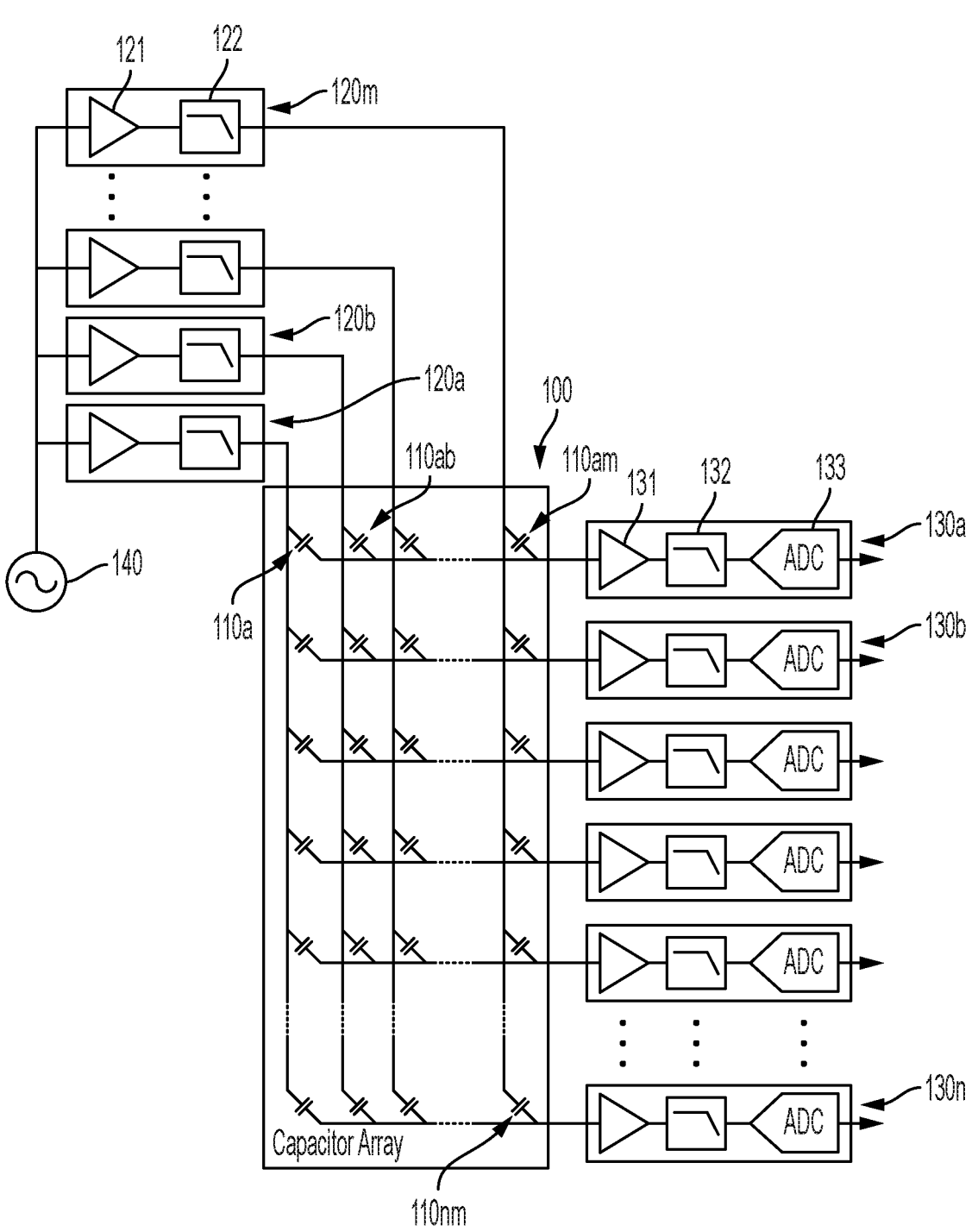
FIG. 1 is a schematic diagram of a physically unclonable function (PUF) device according to a non-limiting embodiment.

With reference to FIG. 1, a physically unclonable function (PUF) device 101 is illustrated according to a non-limiting embodiment. The PUF device 101 includes a capacitor array 100, a plurality of selectable driver circuits 120a-120m, and a plurality of receiver circuits 130a-130n. The capacitor array 100 includes a plurality of randomly or variously valued capacitors 110aa-110mn arranged in an array. The selectable driver circuits 120a-120m each include an amplifier 121 and a low pass filter 122. The receiver circuits 130a-130n each include a transimpedance amplifier 131, a low pass filter 132, and an analog to digital converter (ADC) 133. A selected driver circuit among the selectable driver circuits 120a-120m supplies an AC voltage 140 to the capacitor array 100, which outputs a current. The resulting current is read out by the receiver circuits 130a-130n.

Figure 2A:
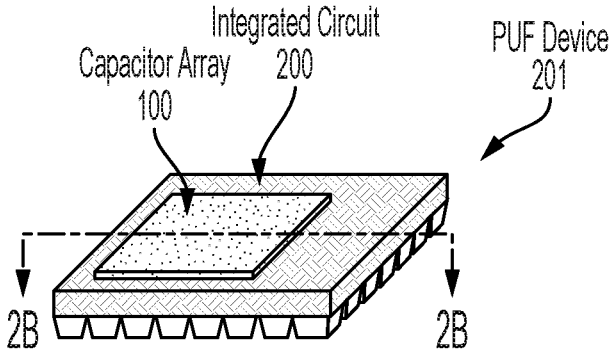
FIG. 2A is a physical view of the PUF device shown in FIG. 1 integrated with an integrated circuit device according to a non-limiting embodiment.
Figure 2B:
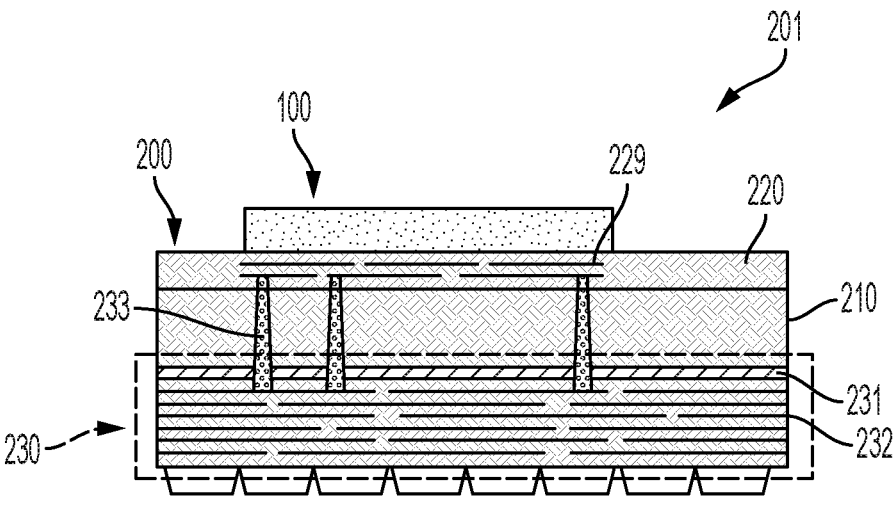
FIG. 2B is a cross-sectional view of the PUF device shown in FIG. 1 taken along line A-A.

With reference now to FIGS. 2A and 2B, a physical view of a PUF device 201 configured to protect an electronic device from being compromised or altered to produce a counterfeit device is illustrated according to a non-limiting embodiment. The PUF device 201 includes a capacitor array 100 and an integrated circuit 200. In one or more non-limiting embodiments, the capacitor array 100, along with driver circuits 120a-120m the receiver circuits 130a-130n (see FIG. 1) can be integrated with the electronic device to be protected.

In this example embodiment, the electronic device to be protected is the integrated circuit 200. The integrated circuit 200 includes a bulk silicon substrate 210, backside metallization 220, and an active circuit layer 230. The backside metallization 220 includes one or more backside metal elements 229 configured to provide an electrical connection to the capacitor array 100. The active circuit layer 230 includes an active device layer 231 and front side metallization 232. One or more through-hole vias (THVs) 233 are formed in the integrated circuit 200 and include a first end that contacts front side metal elements of the front side metallization 232 to the backside metal elements 229. In this manner, the THVs 233 establish an electrical connection between the back side metallization 220 and the active circuit layer 230. In one or more non-limiting embodiment, the driver circuits 120a-120m and the receiver circuits 130a-130n are embedded in the active circuit layer 230 along with other components of the integrated circuit 200 necessary to facilitate a specific application and/or designed function provided by the electronic device 200.

In one or more non-limiting embodiments, the capacitor array 100 can also be physically integrated with the integrated circuit 200. As a result, removal of the capacitor array 100 damages the PUF device 201 causing it to produce an altered fingerprint that is different from the fingerprint produced by the non-damaged or authentic PUF device 201.

In addition, attempting to measure and/or copy the fingerprint of the damaged PUF device 201 is impractical using technology available at the current time or the foreseeable future.

For the example embodiment, the capacitor array 100 can be constructed by embedding conductors of varying shapes and at varying locations in a dielectric material deposited on the bulk silicon substrate 210 with the backside metallization 220 forming metalized contacts that electrically connect to the conductors. The contacts are wired together in the backside metallization, as shown in FIG. 1, to form the capacitor array 100.

It should be appreciated that other capacitor array constructions with other physical relations to the device 200 to be protected can be employed without departing from the scope of the invention. In one or more non-limiting embodiments, for example, the capacitor array 100 can be constructed as an array of parallel conductive elements coupled to a dielectric material having a spatially varying permittivity to define an array of randomly valued capacitors. The conductive elements can be employed using, for example, metal plates. The capacitance of a given capacitor included in the capacitor array 100 is defined by its location with respect to the dielectric material. Accordingly, the values of the capacitance in the capacitor array 100 vary from each other to provide the source of entropy in the PUF device 201 as described herein. In one or more non-limiting embodiments, the capacitances provided by each capacitor in the capacitor array 100 have a random distribution.

Figure 3:
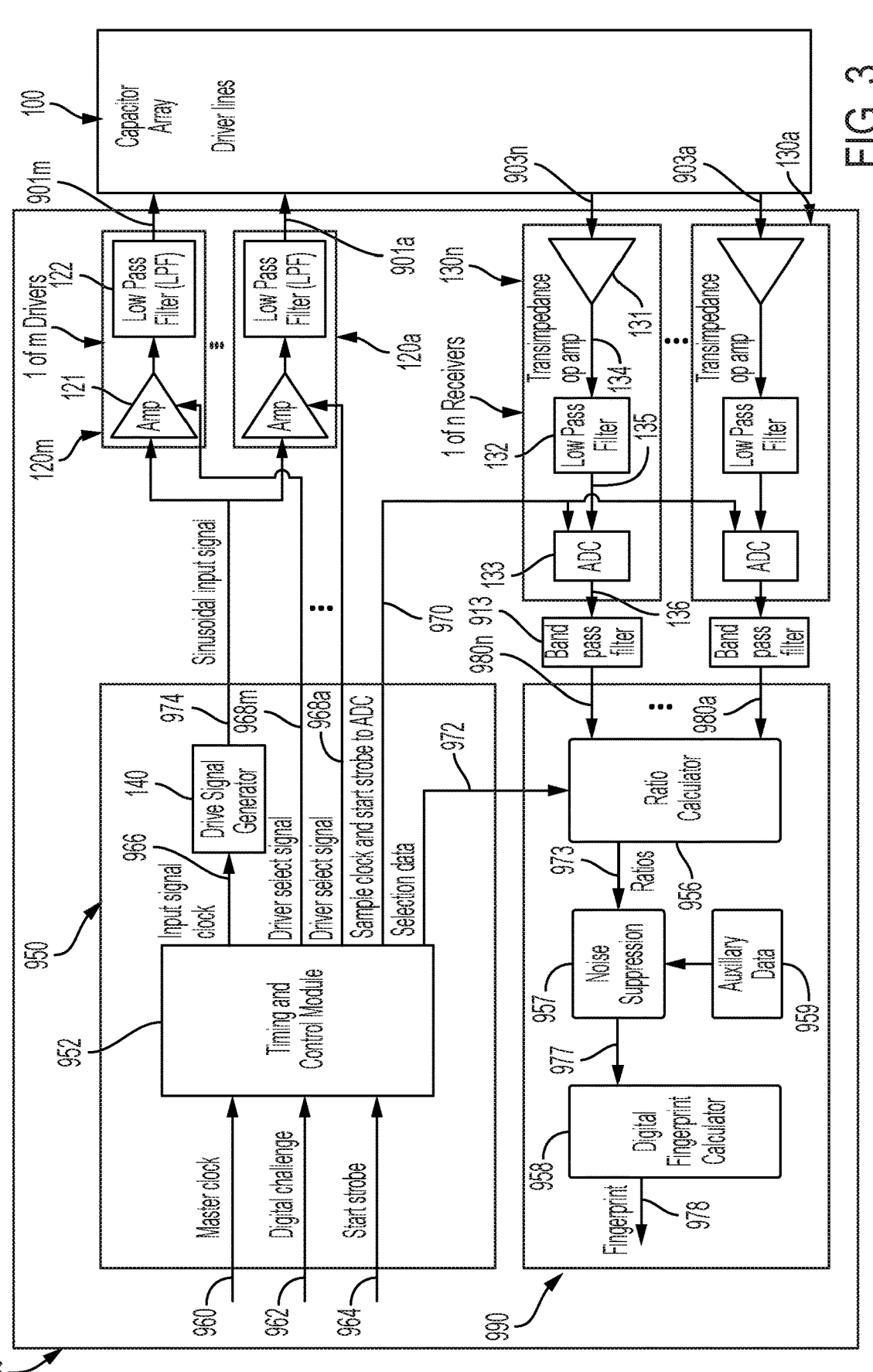
FIG. 3 is a block diagram illustrating an anti-counterfeiting fingerprint readout validity system according to a non-limiting embodiment.

With reference now to FIG. 3, an anti-counterfeiting fingerprint readout validity system 900 is illustrated according to a non-limiting embodiment. The anti-counterfeiting fingerprint readout validity system 900 is in signal communication with a capacitor array 100 and is configured to select the corresponding driver lines 901a-901m and receiver lines 903a-903n as described herein. The system 900 can convert the readout current provided by the capacitor array 100 into a voltage, which can then be used to generate a digital signal (e.g., digital bits) that serves as a digital signature or "fingerprint". The resulting fingerprint can be used to verify the authenticity of the PUF device and thus a product or device that is coupled to the capacitor array 100. In one or more non-limiting embodiments, the authenticity verification can be achieved by comparing the fingerprint obtained by the system 900 to a predetermined expected fingerprint associated with the capacitor array 100.

The system 900 includes a controller 950, a plurality of driver circuits 120a-120m, a plurality of receiver circuits 130a-130n, a plurality of bandpass filters 913, and a digital post processing module 990. Although two driver circuits 120a and 120m are illustrated, it should be appreciated that additional driver circuits can be employed to provide input to a corresponding capacitor array 100 driver line input without departing from the scope of the invention. Similarly, although two receiver circuits 130a and 130n are illustrated, it should be appreciated that additional receiver circuits can be employed to read current from a corresponding capacitor array 100 receiver line 903a-903n without departing from the scope of the invention.

Driver circuits 120a-120m are similar to each other. Although driver circuit 120m is described in this example, the description applies similarly to the other driver circuits included in the system 900. Driver circuit 120m receives an analog sinusoidal input voltage signal 974, and a driver enable signal 968m from controller 950, and outputs an analog sinusoidal driver line voltage to the capacitor array 100. In at least one non-limiting embodiment, driver circuit 120$m$ includes an amplifier 121 and a low-pass filter 122. The amplifier 121 inputs analog sinusoidal voltage signal 974$m$ and driver select signal 968$m$ from controller 950. When the amplifier 121 is selected by the controller 950, the amplified analog sinusoidal voltage is filtered by the driver line low-pass filter 122, and the filtered analog sinusoidal voltage is applied to the associated driver line input to capacitor array 100. The analog sinusoidal voltage output by a given selected driver circuit 120$m$ is input only to the capacitive elements connected to the driver line (e.g., 901$m$) associated with the selected driver circuit (e.g., 120$m$), while the remaining capacitive elements included in the capacitor array 100 are not provided the sinusoidal voltage from the given selected driver circuit. In one or more non-limiting embodiments, a plurality of driver circuits 120 may be selected at a given time, as determined by controller 950.

Receiver circuits 130$a$-130$n$ each receives as an input an analog sinusoidal current from the associated receiver line 903$a$-903$n$ of capacitor array 100, convert the analog sinusoidal current into an analog sinusoidal voltage signal, filter the analog sinusoidal voltage signal, and convert the analog sinusoidal voltage signal into a digital sinusoidal signal. Bandpass filters 913 then filter and output the digital sinusoidal signal to digital post processing module 990. Accordingly, a given receiver circuit (e.g., 903$n$) can provide a digital signal containing information indicative the capacitors in capacitor array 100 that are connected to the associated receiver line 903$a$-903$n$ and one or more selected driver lines 901$a$-901$m$. In at least one non-limiting embodiment, receiver circuits 130$a$ through 130$n$ each include a transimpedance operational amplifier ("op amp") 131, a low-pass filter 132, and an analog-to-digital converter (ADC) 133. The transimpedance operational amplifier 131 is configured to convert the analog sinusoidal current from the selected capacitor array 100 receiver line 903$a$-903$n$ into an analog sinusoidal voltage 134. The analog sinusoidal voltage 134 may contain noise that may result in an inaccurate digital fingerprint. Accordingly, the receiver circuit low-pass filter 132 is provided to suppress high-frequency noise in the sinusoidal voltage signal 134. The ADC 133 samples and converts the analog sinusoidal voltage output 135 from the receiver circuit low-pass filter 132 into a digital sinusoidal signal 136, which is the output of the receiver circuit (e.g., 130$n$). In one or more non-limiting embodiments, a bandpass filter 913 can be coupled to the output of the A/D converter 133 to accumulate samples across multiple sinusoid periods to suppress noise at frequencies other than the frequency of the analog sinusoidal input signal 974 before delivering it to the digital post processing module 990.

In one or more non-limiting embodiments, the digital post processing module 990 includes a ratio calculator module 956, a noise suppression module 957, a digital fingerprint calculator 958, and an auxiliary data store 959. Any one of the ratio calculator module 956, the noise suppression module 957, the digital fingerprint calculator module 958, and the auxiliary data store 959 can be constructed as an electronic hardware controller that includes memory and a processor configured to execute algorithms and computer-readable program instructions stored in the memory.

The digital post processing module 990 inputs digital signals 980$a$-980$n$ calculates a set of ratios using these inputs, and applies noise suppression to the ratios. Based on the results of the calculated set of ratios, the digital post processing module 990 can calculate a digital fingerprint 978 corresponding to the capacitor array 100. In other words, the digital fingerprint 978 is the output of the digital post processing module 990.

The inputs 980$a$-980$n$ to the digital post processing module 990 are indicative of the respective magnitudes of the analog sinusoidal current inputs into receiver circuits 130$a$-130$n$ from the capacitor array 100. In at least one non-limiting embodiment, these magnitudes are functions of the driver circuits 120$a$-120$m$ selected by the TC module 952, the receiver circuits 130$a$-130$n$, and the associated capacitances 110$aa$-110$nm$ corresponding to the selected driver circuit(s) 120$a$-120$m$. A set of ratios 973 are calculated using the magnitudes, with selection data 972 from the TC module 952 determining which magnitudes are used to calculate a given ratio. Coordination of the driver selection signals 968$a$-968$m$ and the selection data 972 allow calculation of ratios 973 that effectively cancel effects that multiplicatively scale the respective magnitudes of inputs 980$a$-980$n$ from their nominal values. Such effects can include, but are not limited to, material and component aging effects, thermally-induced variations, and power supply induced variations. Additionally, the same coordination can achieve ratios 973 that cancel the effects of the driver circuits 120 and receiver circuits 130 upon the digital post processing inputs 980. Therefore, the ratios 973 can be indicative of the capacitances 110$aa$-110$nm$ in capacitor array 100 in a manner effectively independent of material and component aging, temperature, power supply variations, and effects from the driver circuits 120 and receiver circuits 130.

The noise suppression module 957 is in signal communication with the ratio calculator 956 and the auxiliary data 959. The noise suppression module 957 is configured to remove the effects of noise from the digital ratios 973. In at least one non-limiting embodiment, the noise suppression module 957 is implemented using error correction. For example, the noise suppression module 957 can perform block code error correction, with auxiliary data 959 providing the associated parity data.

The digital fingerprint calculator 958 is in signal communication with the noise suppression module 957 and is configured to calculate the digital fingerprint 978. In at least one non-limiting embodiment, the digital fingerprint calculator 958 is implemented as a 256 bit secure hash algorithm such that the digital fingerprint 978 includes a digital value of 256 bits serving as a unique digital signature based on the capacitance ratios 973. Although a digital value of 256 bits is described, it should be appreciated the digital fingerprint 978 can be defined using a different digital value (e.g., 384-bits) without departing from the scope of the invention. In one or more non-limiting embodiments, the system 900 is configured to calculate a plurality of capacitance ratios 973 based on the sampled outputs provided by the digital receiver circuits 130 and bandpass filter 913. Accordingly, the plurality of capacitance ratios can be used to further calculate a quantitative value that is independent of effects such as gain, noise and/or other influences imparted by the digital driver circuits 120 and digital receiver circuits 130. The capacitance ratios 973 can also effectively eliminate influences imparted by temperature changes and/or aging of the components.

In one or more non-limiting embodiments, the controller 950 includes a timing and control (TC) module 952, and a driver signal generator module 954. Any one of the TC module 952, or the drive signal generator module 954 can be constructed as an electronic hardware controller that includes memory and a processor configured to execute algorithms and computer-readable program instructions stored in the memory.

The controller 950 is in signal communication with the input of driver circuits 120a-120m to select the driver lines 901a-901m, and with the ratio calculator module 956 via selection data 972 to select the digital post processing module 990 inputs 980 to be used to generate the ratios that are used to construct the digital fingerprint 978. Accordingly, the controller 950 can select given driver circuits 120 using its driver select signals 968 to energize the associated driver line 901a-901m input to capacitor array 100, and then using selection data 972, select specific digital post processing module 990 inputs 980 to compute a set of ratios. It should be appreciated that more than one driver circuit 120 can be selected at a time without departing from the scope of the invention.

The directions for selection of driver circuits 120, digital post processing inputs 980, and the sequencing of these selections is contained in the digital challenge 962 input to the TC Module 952. In at least one non-limiting embodiment, the digital challenge 962 is comprised of a sequence of 150 bits constructed by concatenating fixed-length fields, with the bits in each field defining the specific driver circuits 120 to be energized and in what order, and the associated data processing inputs 980 to be used as part of the selection data 972 command that defines which ratios are computed by the ratio calculator 956. The processing of each field produces a set of ratios 973 which, after processing by the noise suppression module 957, are provided to the fingerprint calculator module 958 for processing. After all fields in the digital challenge 962 have been processed, the fingerprint calculator module 958 outputs the digital fingerprint 978. It should be appreciated that the size of the digital challenge signal 962 is not limited to 150 bits and that other lengths, formats, and protocols can be implemented without departing from the scope of the invention.

The TC module 952 receives a master clock input signal 960, a digital challenge input signal 962, and a start strobe input signal 964. The master clock input signal 960 can include, for example, an 80 MHz square wave. It should be appreciated that other frequencies and/or wave-types can be implemented without departing from the scope of the invention. Based on the input signals, the TC module 952 outputs a clock signal 966, one or more driver select signals 968, an ADC sample clock and sample start strobe signal 970, and one or more selection data signals 972. The clock signal can include, for example, a 10 MHz clock signal or "clock pulse". It should be appreciated, however, that the clock signal 966 can be set to other frequencies without departing from the scope of the invention. The gate drive signal 974 can include, for example, a 10 MHz sine wave configured to drive a corresponding digital driver circuit 120 as described herein. It should be appreciated, however, that other frequencies and/or wave-types for the gate drive signal 974 can be implemented without departing from the scope of the invention. As described herein, non-limiting embodiments allow for selected receiver lines 903a-903n to be paired together when forming ratios. Accordingly, the selection data signals 972 indicate which particular receiver lines 903a-903n are paired together when forming ratios. It should be appreciated that combinations other than pairs can be implemented within the scope of the invention. In one or more non-limiting embodiments, all the receiver lines 903a-903n included in the PUF device 100 can be readout at a given time. In one or more non-limiting embodiments, the selection data signals 972 can also indicate which receiver lines 903a-903n are to be used to generate the sampled capacitance readings and how the sampled capacitance readings are to be paired together in order to form the capacitance ratio for generating the digital fingerprint 978.

The drive signal generator 954 is in signal communication with the TC module 952 and is configured to generate the sinusoidal driver input signal 974 based on the clock signal 966. For example, the drive signal generator 954 utilizes the clock signal 966 to generate a sine wave 974, which can be used to drive one or more driver circuits 120. It should be appreciated that one or more drive signal generators can be used without departing from the scope of the invention.

Figure 4:
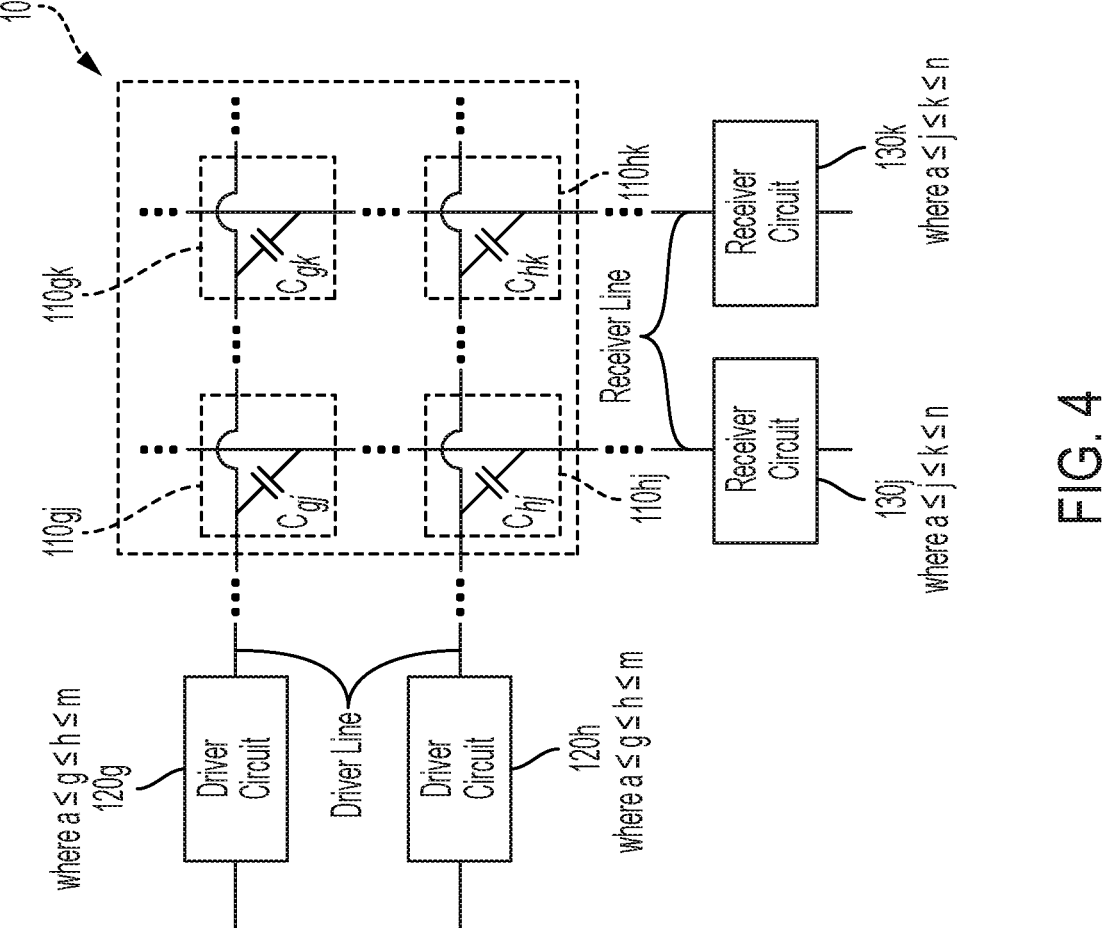
FIG. 4 is a block diagram illustrating an example implementation of capacitor array 100 according to a non-limiting embodiment.

With continued reference to FIG. 3 along with FIG. 4, the latter illustrating at least one non-limiting embodiment, the TC module 952 receives and processes digital challenge 962, and commanded by that information, first selects driver circuit 120g (see FIG. 4), enables the start strobe 970 to the ADCs 133, and the digital post processing inputs 980 are generated. It should be appreciated that some or all of the inputs 980 can be generated without departing from the scope of the invention.

Using selection data 972 derived from the digital challenge 962, the TC module 952 uses selection data 972 to command the ratio calculator module 956 to form a first ratio $R_{11}=\|980j\|/\|980k\|$, where $\|.\|$ denotes magnitude. As a non-limiting example, assume $\|980j\|$ is equal to the product $M_{Dg}M_{Cgj}M_{Rj}$, where $M_{Dg}$ is contributed by driver circuit 120g, $M_{Cgj}$ is contributed by capacitance $C_{gj}$ in capacitor array 100, and $M_{Rj}$ is contributed by receiver circuit 130j and bandpass filter 913. Similarly, $\|980k\|=M_{Dg}M_{Cgk}M_{Rk}$, and therefore $R_{11}=M_{Cgj}M_{Rj}/M_{Cgk}M_{Rk}$, wherein the term $M_{Dg}$ contributed by driver circuit 120g is effectively cancelled. As directed by the challenge data, this process can be repeated to form additional different ratios using other members of the set of inputs 980a-980n. This produces a first set $S_1$ of ratios $\{R_{11}, R_{12}, \ldots \}$.

As commanded by the digital challenge 962, the TC module 952 then repeats this procedure with a second different driver, and the ratio calculator 956 reuses the same selection data 972 to form a second set $S_2$ of ratios $\{R_{21}, R_{22}, \ldots \}$. Again referencing the non-limiting example illustrated in FIG. 4, the TC module 952 selects driver circuit 120h, enables the start strobe 970 to the ADCs 133, and the digital post processing inputs 980a-980n are generated anew. Sets $S_1$ and $S_2$ use the same selection data 972. The ratio calculator computes $R_{21}=\|980j\|/\|980k\|=M_{Dh}M_{Chj}M_{Rj}/M_{Dh}M_{Chk}M_{Rk}=M_{Chj}M_{Rj}/M_{Chk}M_{Rk}$, wherein the term $M_{Dh}$ contributed by driver circuit 120h is effectively cancelled. As directed by the challenge data, this process can be repeated to form additional different ratios using other members of the set of inputs 980a-980n. This produces a second set $S_2$ of ratios $\{R_{21}, R_{22}, \ldots \}$.

A third set $S_3$ of ratios is formed, wherein each ratio Rix in the first set S is divided by its corresponding ratio $R_{2x}$ in the second set $S_2$, effectively cancelling the contributions from the receiver circuits 130 and bandpass filter 913. Again referencing the non-limiting example illustrated in FIG. 4, the set $S_3$ would contain the ratio $R_{31}=R_{11}/R_{21}=(M_{Cgj}M_{Rj}/M_{Cgk}M_{Rk})$ $(M_{Chj}M_{Rj}/M_{Chk}M_{Rk})=(M_{Cgj}M_{Chk})$ $(M_{Cgk}M_{Chj})$. The ratios in this third set $S_3$ are, therefore, effectively formed from the magnitudes of four capacitances (from the array of capacitors 110aa-110mn) connected to the two selected driver lines (from the set of driver circuits 120a-120m), and the two selected inputs (from 980a-980n), and the effects of the selected driver circuits, receiver circuits, and bandpass filters are cancelled. It should be appreciated that ratios other than the ones described can be implemented without departing from the scope of the invention. In the non-limiting embodiment described in FIG. 3, the ratios in this third set $S_3$ form the ratio calculator 956 output 973, and are input to the noise suppression 957 function.

The output 977 from the noise suppression function 957 is input to the digital fingerprint calculator 958. This entire process can be iterated, selecting various driver circuits 120a-120m and ratio calculation 956 inputs 980a-980n in each iteration, and producing a set of inputs 977 to the digital fingerprint calculator 958. After the final iteration, the digital fingerprint calculator 958 outputs the digital fingerprint 978. In the non-limiting embodiment described, a secure hash function is used to combine all inputs 977 to the digital fingerprint calculator 958 into the digital fingerprint 978. The digital fingerprint 978 is thus a function of the selected capacitances in the capacitor array 100. In at least one non-limiting embodiment, the controller 950 can compare the actual digital fingerprint 978 to a predetermined expected fingerprint associated with the PUF device 100. When the actual digital fingerprint 978 matches the predetermined expected fingerprint, a product or device coupled to the PUF device 100 can be verified as authentic, i.e., not counterfeited.

Challenging the PUF device 100 with a first digital challenge indicated by the digital challenge input signal 962 will cause the digital fingerprint calculator 958 to generate a first digital signature, also referred to as a fingerprint. Similarly, challenging the PUF device 100 with a second digital challenge indicated by the digital challenge input signal 962 and different from the first digital challenge signal will cause the digital fingerprint calculator 958 to generate a second digital signature. In either case, the actual digital fingerprint 978 should always match a known fingerprint that is expected to be generated by the PUF device 100. As discussed herein, when the actual fingerprints 978 match the known fingerprints, the PUF device 100 can be verified as being authentic. When, however, the actual fingerprints 978 do not match the known fingerprints, it can be determined that the PUF device 100 is compromised or not authentic, i.e., is counterfeited.

As described herein, various non-limiting embodiments described herein provide a PUF device that can be coupled to a product for the purpose of preventing counterfeiting the product. The PUF device provides entropy that can be extracted and converted into a digital bits. The bits can be used as a unique digital signature or "fingerprint", which makes the PUF device desirable for use in cryptographic applications.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiments were chosen and described in order to best explain the principles of the present disclosure and the practical application, and to enable others of ordinary skill in the art to understand the present disclosure for various embodiments with various modifications as are suited to the particular use contemplated.

While the preferred embodiments to the present disclosure have been described, it will be understood that those skilled in the art, both now and in the future, may make various improvements and enhancements which fall within the scope of the claims which follow. These claims should be construed to maintain the proper protection of the inventive teachings recited herein.

What is claimed is:

1. A method of authenticating an electronic device, the method comprising:

arranging a plurality of conductive elements coupled to a dielectric material having a permittivity to define a capacitor array including a plurality of capacitors;

delivering, via one or more driver circuits, voltage to the capacitor array to energize selected capacitors among the plurality of capacitors;

reading out, via one or more receiver circuits, current that is output by the capacitor array in response receiving the voltage;

determining a capacitance corresponding to the capacitance values of the selected capacitors;

determining a digital measurement based on the capacitance; and determining a digital signature unique to the capacitor array based on the digital measurement;

authenticating the electronic device based on the digital signature, wherein the digital measurement is calculated from at least one ratio of capacitances defined as a first capacitance produced by a first capacitor among the plurality of capacitors and a second capacitance produced by a second capacitor among the plurality of capacitors, and wherein the first capacitance is produced in response to activating a first driver circuit among the one or more driver circuits and activating a first receiver circuit among the one or more receiver circuits, and the second capacitance is produced in response to activating a second driver circuit among the one or more driver circuits and a second receiver circuit among the one or more receiver circuits.

2. The method of claim 1, further comprising:

selecting, via a controller, the one or more driver circuits to supply the voltage; and selecting, via the controller, the one or more receiver circuits to receive the current from the capacitor array.

3. The method of claim 2, wherein authenticating the electronic device comprises:

determining an expected digital signature associated with the capacitor array;

comparing, via the controller, the digital signature to the expected digital signature; and determining, via the controller, the electronic device is authentic in response to the digital signature matching the expected digital signature.

4. The method of claim 2, further comprising:

inputting a digital challenge to the controller;

generating the digital signature indicative of a digital response to the digital challenge;

comparing the digital response to an expected response; and confirming the electronic device is authentic in response to the digital response matching the expected response.

5. The method of claim 1, wherein the first and second capacitors are established as a pair of conductive elements among the plurality of conductive elements, the pair of conductive elements in the capacitor array selected such that the first and second capacitances are measurably different from each other using the at least one ratio of capacitances.

6. The method of claim 5, further comprising removing at least one multiplicatively scaling effect from the capacitance that corresponds to the capacitance values of the selected capacitors, the at least one multiplicatively scaling effect including at least one of component aging, temperature variation, and power supply variation.

* * * * *